United States Patent [19]
Suominen

[11] Patent Number: 5,888,359
[45] Date of Patent: Mar. 30, 1999

[54] FLOCK SEPARATING APPARATUS

[75] Inventor: Hannu L. Suominen, Helsinki, Finland

[73] Assignee: HLS-Elektroautomatiikka OY, Helsinki, Finland

[21] Appl. No.: 836,849

[22] PCT Filed: Nov. 18, 1994

[86] PCT No.: PCT/FI94/00518

§ 371 Date: May 19, 1997

§ 102(e) Date: May 19, 1997

[87] PCT Pub. No.: WO96/15989

PCT Pub. Date: May 30, 1996

[51] Int. Cl.[6] .............................. C25B 15/00; C25B 9/00; B01D 9/00

[52] U.S. Cl. .................... 204/232; 204/240; 204/276; 204/275; 422/255

[58] Field of Search .................... 205/742, 755, 205/757; 204/240, 276, 275, 232; 422/261, 255

[56] References Cited

U.S. PATENT DOCUMENTS 1,099,396  6/1914  Rothwell .

4,834,872  5/1989  Overath .................... 210/151

FOREIGN PATENT DOCUMENTS

WO93/04003  4/1993  WIPO .

OTHER PUBLICATIONS

Patent abstracts of Japan, vol. 9, No.260, C–309, JP A 60–110389, Y. Denki et al., Sludge Concentrating Method, 15 Jun. 1985.

Journal WPCF, vol. 54, No. 12, John R. Bratby, Treatment of Raw Wastewater Overflows by Dissolved–Air Flotation, Dec. 1982, pp. 1558–1565.

Primary Examiner—Kathryn Gorgos
Assistant Examiner—Thomas H Parsons
Attorney, Agent, or Firm—Hill & Simpson

[57] ABSTRACT

A flock separating apparatus, has an electrolytic cell (2) fitted with iron electrode and a separating tank (3), wherein the flock is carried upwards by a hydrogen gas produced in electrolysis. The separating tank (3) has a substantially vertical pipe having a length which is at least 10 times, preferably at least 15–20 times more than its diameter.

7 Claims, 1 Drawing Sheet

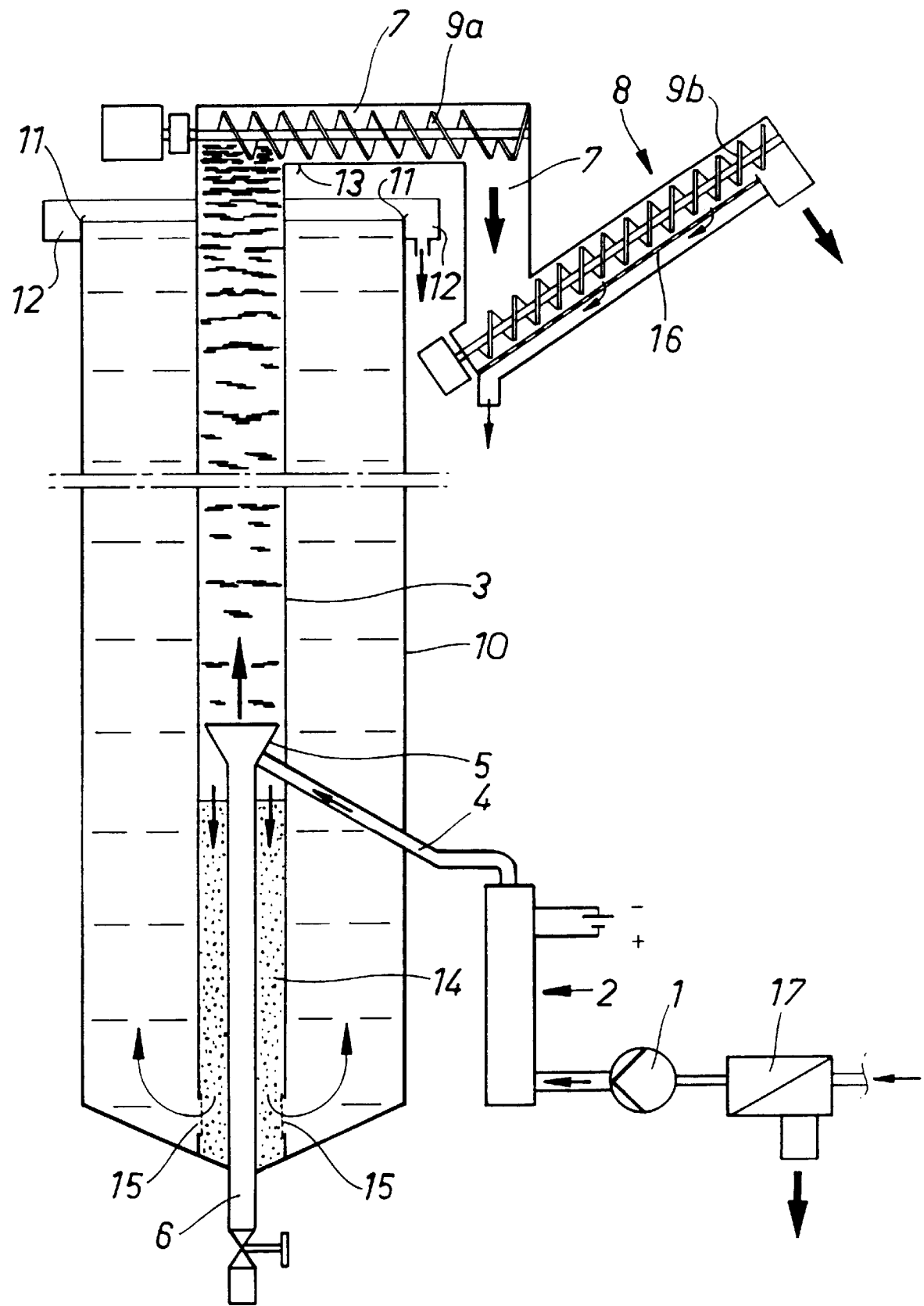

FLOCK SEPARATING APPARATUS

BACKGROUND OF THE INVENTION

This application is a 371 application of a U.S. PCT/FI194/00518 International Application published as WO96/15989 May 30, 1996.

The present invention relates to a flock separating apparatus for use in sewage or sludge treatment, comprising an electrolytic cell and a separating tank, into which the flock developed in the electrolytic cell is delivered and in which the flock rises up through the action of a gas produced in electrolysis.

The treatment or purification of sewage and industrial process waters is conventionally (e.g. International Reference WO 89/06161) carried out by using flock separating tanks with air blown therein, so that the rising air bubbles carry the lighter solids to the surface as flock which can be removed. For example, the Patent publications U.S. Pat. Nos. 4,673,494 and 4,294,697 disclose such a combination of an electrolytic cell and a separating tank such that the electrolytically produced flock can be brought up to the surface in the separating tank by means of a gas released in electrolysis. Such a combination does not allow the use of optimal cell and tank structures and dimensions, resulting in a poor separation efficiency. The prior known flock separating tanks are relatively shallow and have been aimed at a relatively large surface area.

SUMMARY OF THE INVENTION

An object of the invention is to provide an improved flock separating apparatus, wherein the flock rising speed and a resulting separation efficiency have been substantially increased when compared to the prior known equipment.

This object is achieved according to the invention in such a manner that the separating tank comprises a substantially vertical pipe, separated from an electrolytic cell and having a length which is at least 10 times, preferably at least 15 times more than its diameter, and that a feed or supply pipe extending from the electrolytic cell to the separating pipe opens below the mid-point of the separating pipe, said separating pipe having its bottom end connected to a treated-water receiving and discharge tank and its top end rising above the surface level of said receiving and discharge tank.

Thus, an important point in the invention is that a hydrogen gas produced in electrolysis is used for carrying the flock up in a narrow pipe with a high hydrostatic pressure and a high flow rate. Because of a high flow rate, the hydrogen gas adhered to flock particles does not have enough time to separate and, thus, the hydrostatic pressure in a high separating space produces a high rising speed for flock particles. On the other hand, the receiving and discharge tank with a sufficiently large surface area makes sure, according to the principle of communicating vessels, that the water contained in the separating pipe does not pursue a high rising speed and comes virtually to a halt at the water level of said receiving and discharge tank. Thus, the discharging flock carries along a minimal amount of water.

Although the bottom end of the separating pipe could open directly within the opening area of the supply pipe, the separating pipe can be extended downwards e.g. for positioning a sand filter in such a manner that typically about ½–⅛ of the separating pipe length is located below the supply pipe opening area.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

The invention will now be described in more detail by way of an exemplary embodiment with reference made to the single Figure, which shows a flock separating apparatus of the invention in a schematic vertical section.

DESCRIPTION OF THE PREFERRED EMBODIMENTS

The water or sludge subjected to a purification treatment is delivered through a coarse matter separator 17 and supplied by a pump 1 through an electrolytic cell 2 into a separating pipe 3 (see the single Figure). The cell 2 is provided e.g. with iron electrodes for passing therebetween the water or sludge to be treated. The electrodes are supplied with a direct current, the cell being subjected e.g. to the following reactions:

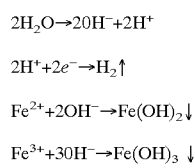

$2H_2O \rightarrow 2OH^- + 2H^+$ $2H^+ + 2e^- \rightarrow H_2 \uparrow$ $Fe^{2+} + 2OH^- \rightarrow Fe(OH)_2 \downarrow$ $Fe^{3+} + 3OH^- \rightarrow Fe(OH)_3 \downarrow$ The developing hydrogen gas adheres to ferro- and ferrihydroxide deposits, which are in turn producing a web or mesh structure for trapping solid impurities. This way, the solid matter flocculates and the flock-adhered hydrogen gas makes the flock lighter than water.

Naturally, the iron electrodes can be replaced with other metal electrodes as well. In addition or instead of hydrogen, the electrolysis may produce other gases as well depending on a liquid to be treated.

The supply pipe 4 opens into a cone 5 included in the separating pipe 3 and is provided at its bottom end with a pipe 6 for collecting and removing heavy objects, such as small rocks. The flock particles begin to rise from the cone 5 upwards in the pipe 3 at quite a high climbing speed. At the top end of said pipe 3 the flock particles pack into a froth-like flock deposit which is forced by a conveyor screw 9a into a flock discharge pipe 7. The pipe 7 carries the flock to a solids separator 8, such as e.g. a filter web, a screw press, a separator, a centrifuge or the like. In the illustrated case, the separator 8 includes a chute-like filter web 16 and a conveyor screw 9b on top of it. The solid matter can be carried e.g. to a composter and the liquid can be returned back to the intake side of the pump 1.

In the illustrated case, the separating pipe 3 extends also downwards from the cone 5 and, thus, it can be fitted with a sand filter 14. The treated water has a passage through ports 15 into a receiving and discharge tank 10 having a surface area which is multiple compared to that of the separating pipe 3. By virtue of this, the climbing speed of water in the separating pipe 3 decelerates in relation to the flock climbing speed for a further improved separation efficiency. In some cases, the tank 10 may simultaneously serve as a storage bin for a liquid to be treated.

Between the inlet of the supply pipe 4 and the ports 15 said separating pipe 3 experiences a flow downwards, the flow rate corresponding to a runoff over an edge 11 into a discharge chute 12. The section of the pipe 3 located below the cone 5 can be replaced with a filter cloth bag for a simpler construction.

The height difference between the overflow edge 11 and a flock discharge edge 13 included in the receiving and discharge tank 10 can be made adjustable e.g. by providing the pipe 3 with a telescopic top end. By adjusting the top end of the pipe 3 (and the pipe 7) downwards it is possible to receive wetter flock more quickly. Thus, the overflow edge 11 must be located slightly below the level of the flock discharge edge 13 but a substantial distance above the inlet of the supply pipe 4. Since the pipes 10 and 3 operate on the principle of communicating vessels, the height difference therebetween must be adjusted or balanced in such a manner that both experience overflow and the height difference is caused or determined by the fact that the flock contained in said separating pipe 3 is lighter than water as a result of the hydrogen gas adhered thereto. Thus, the overflow equilibrium for communicating vessels is achieved by means of vessels having different heights.

The top end of the separating pipe 3 can be provided with a duct for the discharge of hydrogen gas. In major plants, the hydrogen gas can be recovered. It is also possible to recycle the hydrogen gas back into the separating pipe 3 below the cone 5. Of course, it is possible to supply compressed air to the bottom end of the pipe 3 or to include a sand filter 14 in the bottom end of the pipe 3 below the cone 5. The necessity of these extra arrangements depends on an intended application. The invention can be exploited both in a small and a large scale operation. The possible large-scale applications include both industrial waste waters and community sewage. The possible smaller scale applications include e.g. agricultural farms.

In major plants, it is possible to connect several pieces of such equipment in line e.g. such that the top ends of separating pipes 3 included in different pieces of equipment are connected to a common flock discharge pipe 7. The invention has already been practically tested in the purification treatment of liquid manure in a hog farm. Hence, it was found out that the great length of separating pipe 3 in relation to the diameter is a particularly critical factor in view of securing a sufficient climbing speed and separation efficiency. In addition, the large surface area of tank 10 in relation to the surface area of pipe 3 was found advantageous in that water separates effectively from flock instead of pursuing to rise into the flock discharge pipe 7.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpretend as illustrative and not in a limiting sense.

What is claimed is:

1. A flock separating apparatus for use in sewage or sludge treatment, comprising; an electrolytic cell and a separating tank, into which flock developed in the electrolytic cell is delivered and in which the flock rises up through action of a gas produced in electrolysis; the separating tank being a substantially vertical pipe, separated from the electrolytic cell and having a diameter within the range of 100–500 mm and length within the range of 2000–10,000 mm, the length being at least 10 times more than the diameter; a supply pipe extending from the electrolytic cell to the separating pipe the supply pipe opening below a mid-point of the separating pipe, said separating pipe having its bottom end connected to a treated-water receiving and discharge tank and its top end rising above a surface level of said receiving and discharge tank and being connected to a substantially horizontal flock discharge pipe provided with a conveyor, the flock discharge pipe being connected to a solids separator for removing liquid from the flock.

2. The apparatus as set forth in claim 1, wherein said supply pipe opens into the bottom end of the separating pipe or a location along the separating pipe whose distance from the bottom end of the separating pipe is approximately ½–⅛ of the length of the separating pipe, and wherein a top end of the separating pipe has a height which is adjustable and located on a higher level than the surface level in the receiving and discharge tank.

3. The apparatus as set forth in claim 1 wherein the treated-water receiving and discharge tank surrounds the separating tank and has a surface area which is substantially larger than a cross-sectional area of the separating pipe.

4. The apparatus as set forth in claim 1, wherein the separating pipe has its bottom end fitted with a sand filter.

5. The apparatus as set forth in claim 1, wherein said supply pipe is connected to a cone included in the separating pipe, a bottom of said cone opening into a discharge pipe for heavy objects.

6. The apparatus as set forth in claim 1, wherein a section of the separating pipe located below an opening point of the supply pipe is formed of a filter cloth sleeve or bag.

7. The apparatus as claimed in claim 1, wherein the length of the separating tank is at least 15 times more than the diameter of the separating tank.

* * * * *